United States Patent
Schreiber et al.

(10) Patent No.: US 10,059,255 B1
(45) Date of Patent: Aug. 28, 2018

(54) SYSTEMS AND METHODS FOR VEHICLE RECOGNITION USING MOBILE DEVICE

(71) Applicants: Hyundai Motor Company, Seoul (KR); Kia Motors Corporation, Seoul (KR)

(72) Inventors: Michael Schreiber, Frankfurt am Main (DE); Amanda Christiana, Ann Arbor, MI (US); Jens Schenkenberger, Obertshausen (DE); Regina Kaiser, Mainz (DE); Stefan Lessmann, Franfurt am Main (DE); George Hires, Ann Arbor, MI (US); Gerrit de Graag, Darmstadt (DE)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/626,008

(22) Filed: Jun. 16, 2017

(51) Int. Cl.
*H05B 37/02* (2006.01)
*B60Q 1/26* (2006.01)
*G06F 3/01* (2006.01)

(52) U.S. Cl.
CPC .............. *B60Q 1/26* (2013.01); *G06F 3/016* (2013.01); *H05B 37/029* (2013.01); *H05B 37/0236* (2013.01); *H05B 37/0272* (2013.01); *H05B 37/0281* (2013.01)

(58) Field of Classification Search
CPC ............ H05B 37/0236; H05B 37/0272; H05B 37/0281; H05B 37/029; B60Q 1/26
USPC .................................. 340/93, 439, 541, 928
See application file for complete search history.

(56) References Cited

U.S. PATENT DOCUMENTS

| | | | |
|---|---|---|---|
| 6,580,368 B1 | 6/2003 | Jacobs | |
| 6,838,987 B1 | 1/2005 | Quinonez | |
| 8,242,884 B2 | 8/2012 | Holcomb et al. | |
| 2003/0189498 A1* | 10/2003 | Kakihara | G06Q 30/0284 340/928 |
| 2006/0208169 A1* | 9/2006 | Breed | B60N 2/002 250/221 |
| 2010/0228404 A1* | 9/2010 | Link, II | G06F 9/44542 701/1 |
| 2013/0217332 A1* | 8/2013 | Altman | H04H 60/90 455/41.2 |

(Continued)

*Primary Examiner* — Douglas W Owens
*Assistant Examiner* — Syed M Kaiser
(74) *Attorney, Agent, or Firm* — Mintz Levin Cohn Ferris Glovsky and Popeo, P.C.; Peter F. Corless (57) ABSTRACT

A method includes: establishing a wireless communication session with a mobile device of a user and a vehicle control unit equipped in a vehicle; receiving a sequence of vehicle light control signals transmitted from the mobile device defining activation periods during which a vehicle light of the vehicle is to be activated alternating with deactivation periods during which the vehicle light is to be deactivated; and controlling the vehicle light in synchronization with the sequence of vehicle light control signals while the sequence of vehicle light control signals is being received. The controlling of the vehicle light includes: continuously transmitting activation signals to the vehicle control unit to activate the vehicle light during each of the activation periods; and refraining from transmitting the activation signals to the vehicle control unit to deactivate the vehicle light during each of the deactivation periods.

19 Claims, 6 Drawing Sheets

(56) References Cited

U.S. PATENT DOCUMENTS

| | | | |
|---|---|---|---|
| 2014/0129051 A1* | 5/2014 | Gautama | B60R 25/245 701/2 |
| 2014/0277844 A1* | 9/2014 | Luke | G07C 5/008 701/2 |
| 2015/0054639 A1* | 2/2015 | Rosen | G06K 9/00785 340/439 |
| 2016/0214528 A1* | 7/2016 | Eastman | B60Q 1/444 |
| 2016/0267759 A1* | 9/2016 | Kerzner | G08B 13/19645 |
| 2016/0316363 A1* | 10/2016 | Li | H04W 12/04 |
| 2017/0144596 A1* | 5/2017 | Wu | B60Q 9/008 |
| 2017/0193824 A1* | 7/2017 | Wu | H04N 7/181 |
| 2017/0223807 A1* | 8/2017 | Recker | H05B 37/0227 |
| 2017/0263120 A1* | 9/2017 | Durie, Jr. | G06F 17/30823 |
| 2017/0267170 A1* | 9/2017 | Be | B60Q 9/00 |
| 2017/0301201 A1* | 10/2017 | Siann | H04N 7/185 |
| 2017/0309092 A1* | 10/2017 | Rosenbaum | G07C 5/008 |
| 2017/0337814 A1* | 11/2017 | Morgan | G08G 1/0965 |

* cited by examiner

SYSTEMS AND METHODS FOR VEHICLE RECOGNITION USING MOBILE DEVICE

TECHNICAL FIELD

The present disclosure relates generally to systems and methods for vehicle recognition, and more particularly, to systems and methods for vehicle recognition using a mobile device in communication with a vehicle.

BACKGROUND

Many vehicle owners, at some point, have experienced difficulty in locating their parked vehicle among several vehicles in a large parking lot, parking garage, or the like. Similarly, with the growing popularity of ride-sharing businesses, such as Uber™, Lyft™, and others, it is often difficult for a customer to locate a vehicle designated to pick-up to the customer, particularly in congested areas. These vehicles often lack special markings which cause them to blend in among other vehicles. This problem is exacerbated when a ride-sharing company employs a fleet of identical vehicles, making the prospect of identifying the customer's designated vehicle even more troublesome.

SUMMARY

The present disclosure provides techniques for enhancing a user's ability to recognize a vehicle using a mobile device in communication with a control unit of a vehicle. One or more lights of the vehicle can be activated and deactivated in synchronization with a sequence of vehicle light control signals transmitted from a user's mobile device. During transmission of the vehicle light control signal sequence, activation and deactivation of the vehicle lights can be controlled correspondingly in real-time. For example, a user can create a sequence of touch input pulses at the mobile device, and the vehicle light(s) can be controlled to flash in synchronization with the user's touch input. The vehicle light control signal sequence can also be generated at the mobile device based on predefined patterns or the beats per minute (BPM) of a song playing on the mobile device. In addition, tactile feedback can be delivered to the mobile device to further assist the user in locating the vehicle.

According to embodiments of the present disclosure, a method includes: establishing, by a remote server, a wireless communication session with a mobile device of a user and a vehicle control unit equipped in a vehicle; receiving, at the remote server, a sequence of vehicle light control signals transmitted from the mobile device defining activation periods during which a vehicle light of the vehicle is to be activated alternating with deactivation periods during which the vehicle light is to be deactivated; and controlling, by the remote server, the vehicle light in synchronization with the sequence of vehicle light control signals while the sequence of vehicle light control signals is being received at the remote server. The controlling of the vehicle light in synchronization with the sequence of vehicle light control signals includes: continuously transmitting, by the remote server, activation signals to the vehicle control unit to activate the vehicle light during each of the activation periods; and refraining, by the remote server, from transmitting the activation signals to the vehicle control unit to deactivate the vehicle light during each of the deactivation periods.

The remote server may activate and deactivate the vehicle light in accordance with a vehicle light activation pattern defined by the sequence of vehicle light control signals. Also, a length of the activation periods and the deactivation periods, respectively, may be variable throughout the sequence of vehicle light control signals.

The vehicle light control signal sequence can be generated by user input of the user. For instance, the activation periods may be defined as periods during which the user presses an input element of the mobile device, and the deactivation periods may be defined as periods during which the user releases the input element of the mobile device. The input element may be a button of the mobile device or a button displayed on a touch screen of the mobile device.

Alternatively, the sequence of vehicle light control signals can be selected by the user among a plurality of predefined sequences of vehicle light control signals. For instance, the vehicle light activation signals may be transmitted to the remote server from the mobile device according to a vehicle light activation pattern defined by the user-selected predefined sequence of vehicle light control signals.

Alternatively, the sequence of vehicle light control signals is defined according to beats per minute (BPM) of a song currently playing on the mobile device. For instance, the vehicle light activation signals may be transmitted to the remote server from the mobile device according to a vehicle light activation pattern defined by the BPM of the currently playing song.

The vehicle may be a ride-sharing vehicle providing transportation for the user in response to a request from the user for a ride using a ride-sharing service.

The method may further include controlling, by the remote server, tactile feedback of the mobile device according to a distance between the mobile device and the vehicle or according to an orientation of the mobile device with respect to the vehicle. In this regard, the controlling of delivery of tactile feedback may include causing, by the remote server, the tactile feedback of the mobile device to increase in intensity as the distance between the mobile device and the vehicle decreases. The controlling of delivery of tactile feedback may also include controlling, by the remote server, a length of tactile feedback pulses of the mobile device according to the orientation of the mobile device with respect to the vehicle.

The wireless communication session with the mobile device and the vehicle control unit may be established via a cellular network or via Bluetooth.

The method may further include: receiving, at the remote server, location information from the vehicle control unit indicating a location of the vehicle; calculating, by the remote server, a location or a speed of the vehicle based on the received location information; determining, by the remote server, whether the calculated location or the calculated speed satisfies a predetermined threshold; and controlling, by the remote server, the vehicle light in synchronization with the sequence of vehicle light control signals when it is determined that the predetermined threshold is satisfied.

Furthermore, in accordance with embodiments of the present disclosure, a system includes: a vehicle having a vehicle control unit equipped therein; a mobile device of a user; and a remote server operable to wirelessly communicate with the mobile device and the vehicle control unit. The remote server is configured to: establish a wireless communication session with the mobile device and the vehicle control unit; receive a sequence of vehicle light control signals transmitted from the mobile device defining activation periods during which a vehicle light of the vehicle is to be activated alternating with deactivation periods during which the vehicle light is to be deactivated; and control the vehicle light in synchronization with the sequence of vehicle light control signals while the sequence of vehicle light control signals is being received at the remote server. The controlling of the vehicle light in synchronization with the sequence of vehicle light control signals includes: continuously transmitting, by the remote server, activation signals to the vehicle control unit to activate the vehicle light during each of the activation periods; and refraining, by the remote server, from transmitting the activation signals to the vehicle control unit to deactivate the vehicle light during each of the deactivation periods.

Furthermore, according to embodiments of the present disclosure, a method includes: establishing, by a remote server, a wireless communication session with a mobile device of a user and a vehicle control unit equipped in a vehicle; receiving, at the remote server, positional information of the mobile device and positional information of the vehicle; calculating, by the remote server, a distance between the mobile device and the vehicle or an orientation of the mobile device with respect to the vehicle according to the positional information of the mobile device and the positional information of the vehicle; and controlling, by the remote server, tactile feedback of the mobile device according to the calculated distance between the mobile device and the vehicle or according to the calculated orientation of the mobile device with respect to the vehicle.

Furthermore, according to embodiments of the present disclosure, a system includes: a vehicle having a vehicle control unit equipped therein; a mobile device of a user; and a remote server operable to wirelessly communicate with the mobile device and the vehicle control unit. The remote server is configured to: establish a wireless communication session with the mobile device and the vehicle control unit; receive positional information of the mobile device and positional information of the vehicle; calculate a distance between the mobile device and the vehicle or an orientation of the mobile device with respect to the vehicle according to the positional information of the mobile device and the positional information of the vehicle; and control tactile feedback of the mobile device according to the calculated distance between the mobile device and the vehicle or according to the calculated orientation of the mobile device with respect to the vehicle.

BRIEF DESCRIPTION OF THE DRAWINGS

The embodiments herein may be better understood by referring to the following description in conjunction with the accompanying drawings in which like reference numerals indicate identically or functionally similar elements, of which.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit (or vehicle control unit, e.g., an electronic control unit (ECU) equipped in a vehicle). The term "control unit" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the control unit in conjunction with one or more other components, as would be appreciated by a person of ordinary skill in the art.

Furthermore, the control unit of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Referring now to embodiments of the present disclosure, the disclosed techniques allow a user to generate a sequence of vehicle light control signals using a mobile device to enhance the user's ability to recognize a vehicle (e.g., in a crowded area, a parking lot, etc.). One or more lights of the vehicle can be activated and deactivated in synchronization with a sequence of vehicle light control signals transmitted from the mobile device. Upon transmission of the vehicle light control signal sequence, activation and deactivation of the vehicle light(s) can be controlled correspondingly in real-time. For example, the user can create a sequence of touch inputs at the mobile device, and a vehicle light can be controlled to flash in synchronization with the user's touch input. The control signal sequence can also be generated at the mobile device based on predefined patterns or the beats per minute (BPM) of a song playing on the mobile device. In addition, tactile feedback can be delivered to the mobile device to further assist the user in locating the vehicle.

Figure 1:
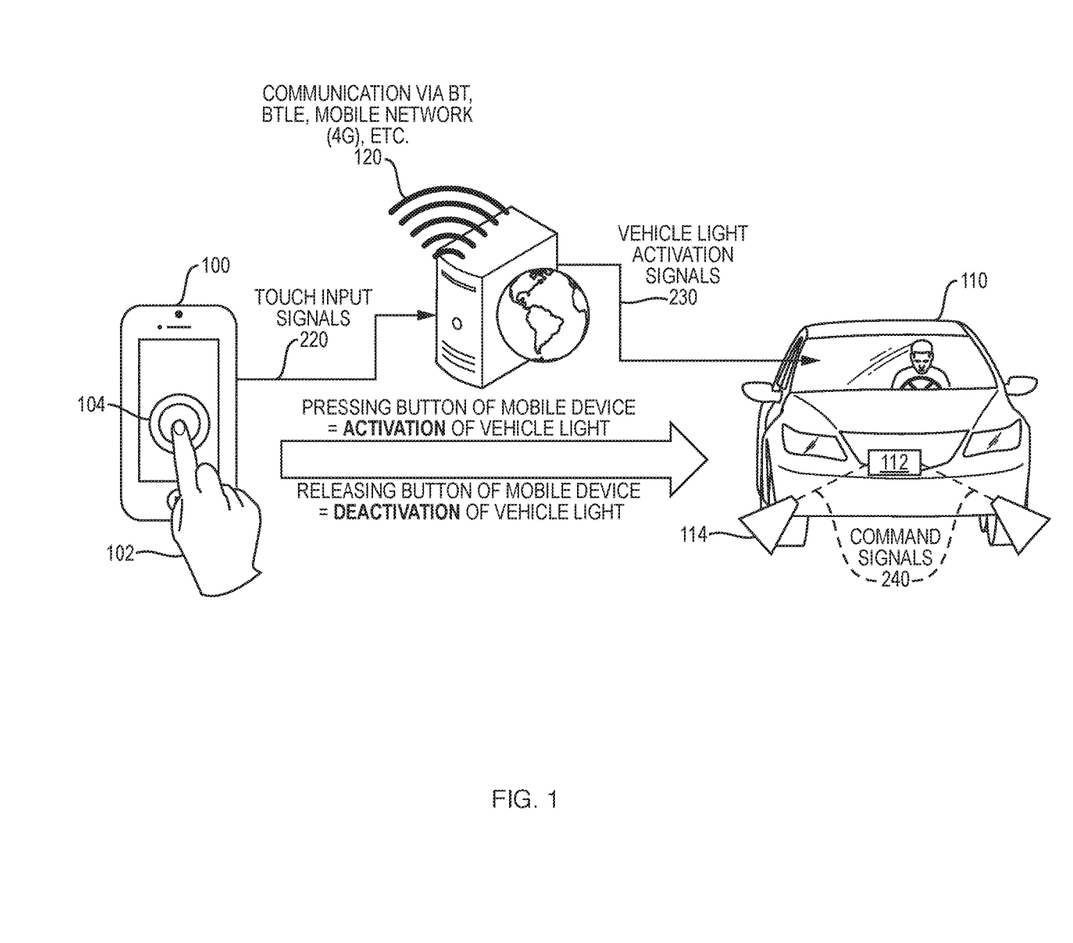
FIG. 1 is a diagram illustrating an exemplary wireless communication session between a mobile device and a vehicle control unit of a vehicle.

The techniques described above rely on a wireless communication session established with a mobile device of a user and a vehicle control unit of a vehicle via a remote server. To demonstrate, FIG. 1 is a simplified diagram illustrating an exemplary wireless communication session between a mobile device and a vehicle control unit of a vehicle. As shown in FIG. 1, a remote server 120 operable to wirelessly communicate with a mobile device 100 belonging to a user 102 and with a vehicle control unit 112 equipped in a vehicle 110 can establish a wireless communication session with the mobile device 100 and vehicle 110. The wireless communication session with the mobile device 100 and vehicle 110 can be established via a cellular network (e.g., Long-Term Evolution (LTE), 4G, 3G, etc.) or via Bluetooth (BT) (or a variation thereof, such as Bluetooth low energy (BTLE), etc.).

A sequence of vehicle light control signals can be generated at the mobile device 100, using a variety of techniques, and the vehicle light control signals can be transmitted from the mobile device 100 to the remote server 120. The vehicle light control signals generated at the mobile device 100 can be used by the server 120 to control one or more vehicle lights 114 of the vehicle 110 in real-time, such that the vehicle light 114 flashes in synchronization with the sequence of vehicle light control signals. The one or more vehicle lights 114 may include any light equipped on the vehicle 110, such as, for example, one or more of a vehicle's headlights, low beams, high beams, running lights, fog lamps, parking lights, turn signal lights, or the like. The one or more vehicle lights 114 may also include any accessory light (not shown) mounted to an exterior or interior of the vehicle 110 and operatively coupled to the vehicle control unit 112.

For instance, the vehicle light control signals transmitted from the mobile device 100 can be produced according to touch input signals 220 received at the mobile device 100, as shown in FIG. 1. The touch input signals 220 may be generated by a user 102 providing a sequence of touch inputs to the mobile device 100. That is, the user 102 may alternately press and release, for varying durations, an input element of the mobile device 100 several times. The touch input signals 220 thus represent a sequence of vehicle light control signals. Here, the touch input signals 220 may define activation periods when the user 102 is pressing the input element of the mobile device 100, during which the vehicle light 114 of the vehicle 110 is to be activated, alternating with deactivation periods when the user 102 has released the input element of the mobile device 100, during which the vehicle light 114 is to be deactivated. The input element may be any button of the mobile device 100. Additionally, the button may be displayed on a touchscreen of the mobile device 100, e.g., button 104, as shown in FIG. 1.

Figure 2:
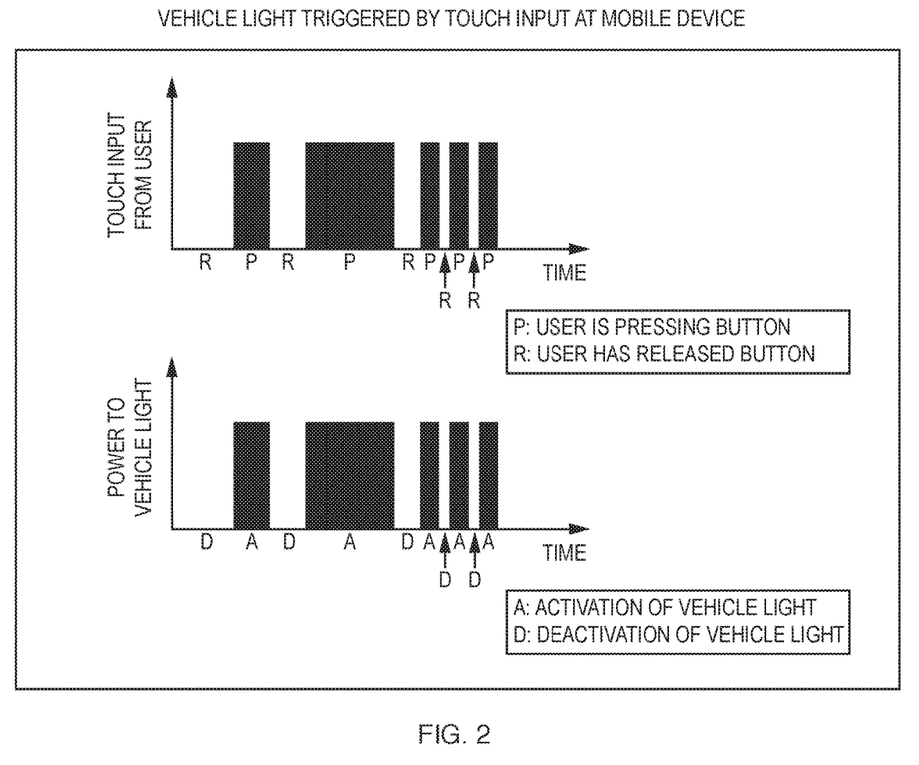
FIG. 2 is a diagram illustrating an exemplary sequence of vehicle light control signals generated by touch input at a mobile device.

To demonstrate, FIG. 2 is a diagram illustrating an exemplary sequence of vehicle light control signals generated by touch input at a mobile device. As shown in FIG. 2, the user 102 can alternately press (P) and release (R), for varying durations, an input element (e.g., button 104) of the mobile device 100 over a period of time. The touch input from the user 102 at the mobile device 100 (e.g., via button 104) can generate a sequence of vehicle light control signals that define a plurality of activation periods (A) during which the vehicle light 114 is to be activated alternating with deactivation periods (D) during which the vehicle light 114 is to be deactivated. As further shown in FIG. 2, the vehicle light 114 can be activated and deactivated in synchronization with the touch input from the user 102 at the mobile device 100. That is, while the user 102 is pressing (P) the input element of the mobile device 100, the vehicle light 114 is activated (A) for a corresponding duration, and while the user 102 has released (R) the input element of the mobile device 100, the vehicle light 114 is deactivated (D) for a corresponding duration. The result is that the vehicle light 114 can be controlled, in substantially real-time, to match the touch input provided by the user 102 at the mobile device 100.

Figure 3:
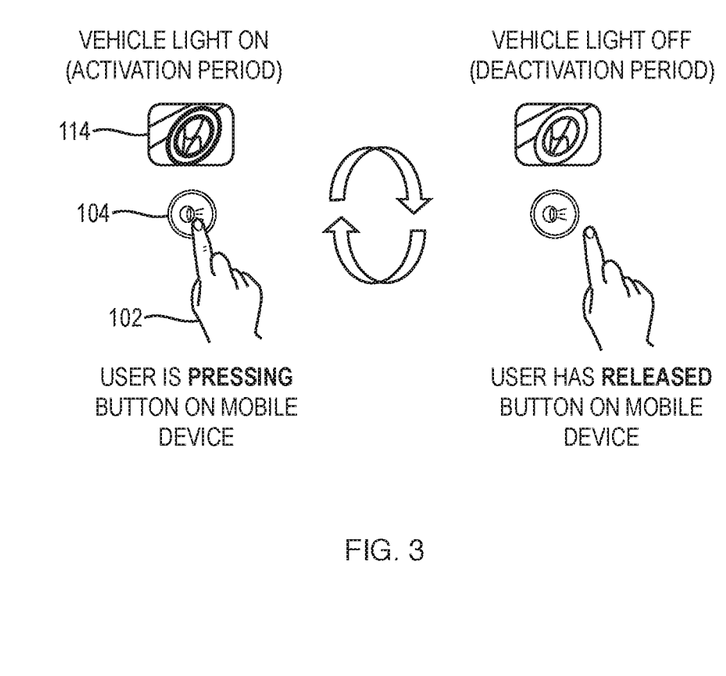
FIG. 3 is a diagram illustrating the activation and deactivation of a vehicle light in synchronization with an exemplary sequence of vehicle light control signals.

As an example, FIG. 3 is a diagram illustrating the activation and deactivation of a vehicle light in synchronization with an exemplary sequence of vehicle light control signals. As shown in FIG. 3, while the user 102 is pressing a button 104 of the mobile device 100, the vehicle light 114 can be activated until the button 104 is released. This period is referred to herein as the "activation period." Once the user 102 releases the button 104, the vehicle light 114 can be deactivated until the button 104 is pressed again. This period is referred to herein as the "deactivation period." This process can repeat indefinitely, so long as the user 102 continues to provide touch input (i.e., presses the button 104) on the mobile device 100.

Notably, the touch input sequence generated by the user 102 at the mobile device 100 can produce a vehicle light activation pattern (i.e., a pattern according to which the vehicle light 114 is activated/deactivated), as demonstrated in FIG. 2. As there are no limitations on how long or short the user 102 may press or release the input element of the mobile device 100, the vehicle light activation pattern can be set by the user 102 in any suitable manner. This means that each vehicle light activation pattern can potentially be unique, thereby facilitating the ability of the user 102 to identify the vehicle 110 whose lights 114 are flashing according to a unique pattern, particularly in crowded areas where several vehicles are located. Although the vehicle light activation pattern is shown in FIGS. 1-3 as being defined by touch input signals 220 provided by the user 102 at the mobile device 100, the vehicle light activation pattern can alternatively be defined by other methods, such as a predefined vehicle light activation pattern selected by the user 102, matching the vehicle light activation pattern to the beats per minute (BPM) of a song currently playing on the mobile device 100.

Referring once again to FIG. 1, the sequence of vehicle light control signals (e.g., touch input signals 220) generated at the mobile device 100 can be transmitted to a remote, central server 120 (via cellular networks, Bluetooth-based communication, or the like). The server 120 can then control the vehicle light 114, based on the received sequence of vehicle light control signals, by transmitting a series of vehicle light activation signals 230 to the vehicle control unit 112 of the vehicle 110. The server 120 can transmit the vehicle light activation signals 230 to the vehicle control unit 112 nearly simultaneously with receipt of the vehicle light control signals from the mobile device 100 (a negligible delay in transmission may exist). This way, the vehicle light 114 can be controlled in synchronization with the sequence of vehicle light control signals, in substantially real-time, while the sequence of vehicle light control signals is being received at the remote server 120.

In the case of controlling the vehicle light 114 using touch input, the activation period (when the vehicle light 114 is activated) can be defined as the period during which the user 102 is pressing a button 104 of the mobile device 100, and the deactivation period (when the vehicle light 114 is deactivated) can be defined as the period during which the user 102 has released the button 104, as explained above. In other cases, the activation period and deactivation period can be defined according to, for example, a predefined sequence of vehicle light control signals selected by the user 102 among a plurality of predefined sequences of vehicle light control signals, or the BPM of a song currently playing on the mobile device 100. In either case, the remote server 120 may control the vehicle light 114 in synchronization with the sequence of vehicle light control signals by continuously transmitting vehicle light activation signals ("activation signals") 230 to the vehicle control unit 112 to activate the vehicle light 114 during each of the activation periods, and by refraining from transmitting the activation signals 230 to the vehicle control unit 112 to deactivate the vehicle light 114 during each of the deactivation periods.

In response to receiving each activation signal 230 from the remote server 120, the vehicle control unit 112 can activate the vehicle light 114 (e.g., by transmitting command signals 240, as would be understood in the art). The vehicle control unit 112 can continuously monitor for receipt of activation signals 230, and can keep the vehicle light 114 activated so long as the activation signals are being received. When the activation signals 230 are not being received, on the other hand, the vehicle control unit 112 can deactivate the vehicle light 114, until an activation signal 230 is received once again.

Figure 4:
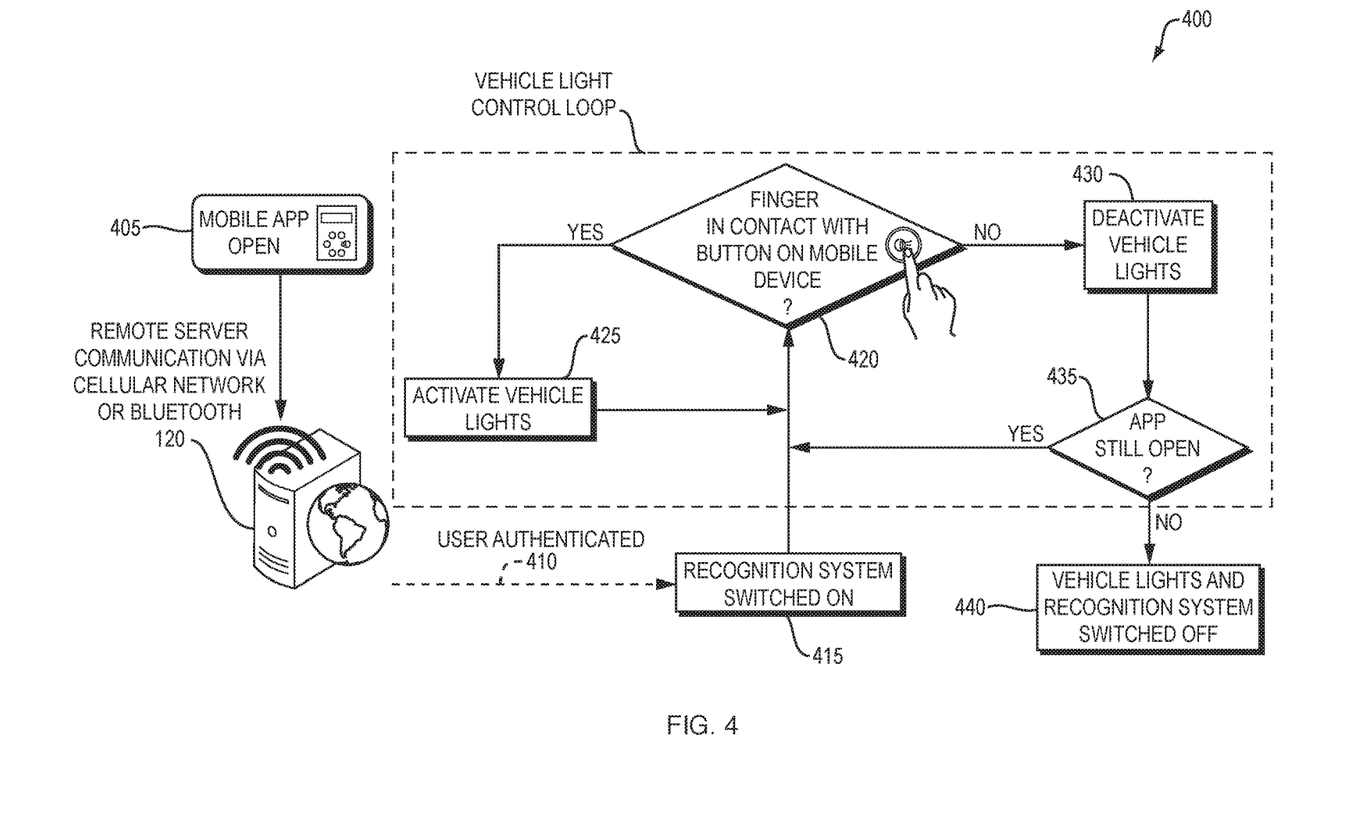
FIG. 4 is a flow chart illustrating an exemplary simplified procedure for controlling a light of a vehicle belonging to the user in synchronization with a sequence of vehicle light control signals generated at a mobile device.

The vehicle recognition techniques described herein are applicable in various scenarios. For example, FIG. 4 is a flow chart illustrating an exemplary simplified procedure for controlling a light of a vehicle belonging to the user in synchronization with a sequence of vehicle light control signals generated at a mobile device. The procedure 400 may start at step 405, and continue to step 410, where, as described in greater detail herein, a user 102 can generate a sequence of vehicle light control signals using the mobile device 100 to control activation and deactivation of one or more lights of a vehicle 110 which, in one possible scenario, belongs to the user 102, such as an instance where the user 102 is searching for his or her vehicle 110 parked in a large, crowded parking lot.

At step 405, an application running on the mobile device 100 can be opened to initiate the vehicle recognition system described herein. The remote server 120, which is operable to wirelessly communicate with the mobile device 100 and the vehicle control unit 112 of the vehicle 110, may receive notification of the application initiation from the mobile device 100. In response, the server 120 can attempt to authenticate the user 102 of the mobile device 100 at step 410. Authentication may be suitably performed by the server 120 using any authentication techniques generally known in the art, e.g., digital or analog techniques, using any number and/or variety of wireless security protocols.

Upon authentication of the user 102, at step 415, the server 120 can communicate with the vehicle control unit 112 of the user's vehicle 110 to initiate the vehicle recognition system. At this point the vehicle control unit 112 may begin monitoring for activation signals 230 transmitted from the server 120 (step 420).

As described above, in the case of the user 102 providing touch input to the mobile device 100 to control the vehicle lights 114, vehicle light activation periods can be defined as periods during which the user's finger is in contact with an input element (e.g., button 104) of the mobile device 100, while vehicle light deactivation periods can be defined as periods during which the user's finger releases from the input element of the mobile device 100. During each activation period, the server 120 can continuously transmit the vehicle light activation signals 230 to the vehicle 110, and transmission of the vehicle light activation signals 230 can be stopped once the activation period ends and a deactivation period begins.

Accordingly, if a vehicle light activation signal 230 is received at the vehicle control unit 112, meaning the user 102 is touching the input element of the mobile device 100, the vehicle control unit 112 can activate the vehicle light(s) 114, at step 425. Conversely, if no vehicle light activation signal 230 is received at the vehicle control unit 112, meaning the user 102 is not touching the input element of the mobile device 100, the vehicle control unit 112 can deactivate the vehicle light(s) 114, at step 430. The vehicle control unit 112 may continue to monitor for activation signals 230 from the server 120 and repeat steps 420-430, as shown in FIG. 4, so long as the mobile device 100 is still running the application (step 435), thus forming a vehicle light control loop in which the vehicle lights 114 are synchronized with touch input from the user 102 at the mobile device 100.

Once the application running on the mobile device 100 has been closed, the vehicle control unit 112 may deactivate the vehicle lights 114, and the vehicle recognition system may terminate. The server 120 may inform the vehicle control unit 112 of termination of the vehicle recognition system, indicating that the vehicle control unit 112 no longer needs to monitor for activation signals 230 from the server 120.

The procedure 400 illustratively ends at step 440. The techniques by which the steps of procedure 400 may be performed, as well as ancillary procedures and parameters, are described in detail above.

It should be noted that the steps shown in FIG. 4 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. The illustrated steps may also be modified in any suitable manner in accordance with the scope of the present claims.

Figure 5:
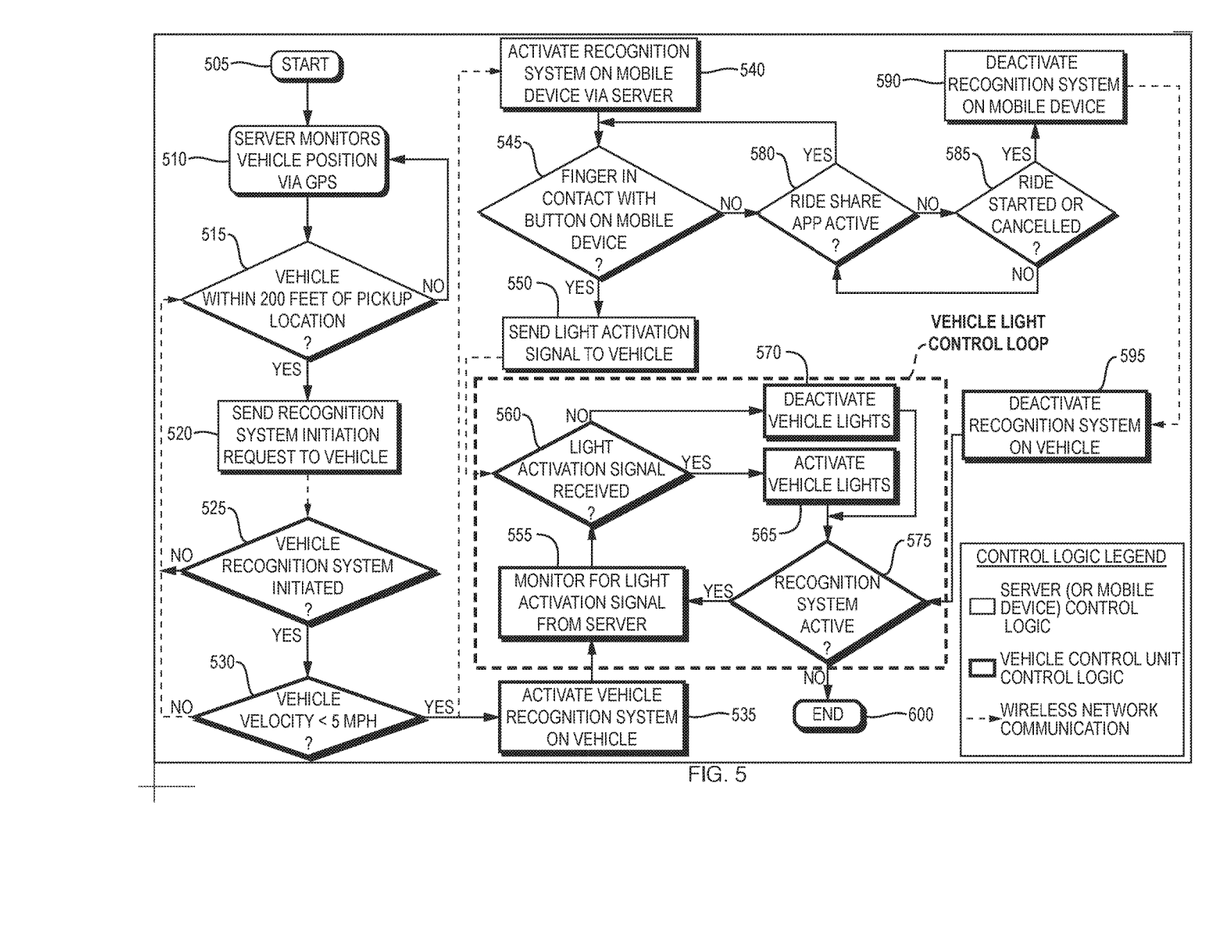
FIG. 5 is a flow chart illustrating an exemplary simplified procedure for controlling a light of a ride-sharing vehicle providing transportation for the user in synchronization with a sequence of vehicle light control signals generated at a mobile device.

As another example, FIG. 5 is a flow chart illustrating an exemplary simplified procedure for controlling a light of a ride-sharing vehicle providing transportation for the user in synchronization with a sequence of vehicle light control signals generated at a mobile device. The procedure 500 may start at step 505, and continue to step 510, where, as described in greater detail herein, a user 102 can generate a sequence of vehicle light control signals using the mobile device 100 to control activation and deactivation of one or more lights of a vehicle 110 which, in one possible scenario, is a ride-sharing vehicle providing transportation for the user 102 in response to a request from the user 102 for a ride using a ride-sharing service. The vehicle recognition techniques described herein may be particularly helpful in such a scenario since users often experience difficulty in identifying ride-sharing vehicles, as the user 102 may not know what the vehicle looks like, the area in which the vehicle 110 is located may be heavily congested, it may be dark outside, etc. As shown in FIG. 5, steps having no shading may be performed by control logic of the remove server 120 (or, in some cases, control logic of the mobile device 100), while steps having shading may be performed by control logic of the vehicle control unit 112. Dashed lines indicate communication via a wireless network (e.g., cellular networks, Bluetooth-based networks, or the like).

The procedure 500 may start at step 505 when the user 102 requests a ride from a ride-sharing service, e.g., Uber™, Lyft™, etc., and a ride-sharing vehicle is assigned to pick-up and transport the user 102. At step 510, the remote server 120, which is operable to wirelessly communicate with the vehicle control unit 112 and the mobile device 100, may begin to monitor the position of the vehicle 110 using information transmitted to the server 120 from the vehicle 110 (e.g., global positioning system (GPS) data obtained using a GPS device equipped in the vehicle 110).

Activation of the vehicle recognition system described herein may be delayed until the vehicle 110 is relatively close to the user 102. A predetermined distance threshold may be established for the purpose of determining whether the vehicle 110 is sufficiently close to the user 102, such that the vehicle lights 114 of the vehicle 110 would be visible to the user. For instance, the server 120 may determine in step 515 whether the vehicle 110 is within 200 feet of the user's location (determined, e.g., using built-in GPS of mobile device 100) or a designated pick-up location. The predetermined distance threshold may be adjusted according to preferences of the operator.

If the vehicle 110 is not within the predetermined distance threshold (e.g., 200 feet) of the user 102 or the designated pick-up location, the server 120 may continue to monitor the position of the vehicle 110 to detect when the vehicle 110 has moved within the distance threshold. On the other hand, if the vehicle 110 is within the predetermined threshold, the server 120 may send a vehicle recognition initiation system request to the vehicle control unit 112 of the vehicle 110 at step 520, and may repeat this step until it is determined at step 525 that the vehicle recognition system has been initiated. Here, the server 120 may attempt to authenticate the vehicle 110. Authentication may be suitably performed by the server 120 using any authentication techniques generally known in the art, e.g., digital or analog techniques, using any number and/or variety of wireless security protocols.

At step 530, the server 120 may determine whether the vehicle 110 has slowed to a velocity less than a predetermined velocity threshold (e.g., 5 miles-per-hour (mph)) using information transmitted to the server 120 from the vehicle 110 (e.g., GPS data, internal sensor data, etc.). If the vehicle 110 slows down or stops completely, and it is located within a predetermined distance of the user 102, it can be assumed the driver of the vehicle 110 is attempting to complete the pick-up of the user 102.

At steps 535 and 540, the server 120 may wirelessly communicate with the vehicle control unit 112 and the mobile device 100 to activate the vehicle recognition system on the vehicle 110 and the mobile device 100, respectively. At this point, the user 102 may use various techniques described hereinabove to generate a sequence of vehicle light control signals which are transmitted to the server 120 and forwarded to the vehicle control unit 112 as activation signals 230. The vehicle control unit 112 may simultaneously begin monitoring for the activation signals 230 from the server 120, and activate the vehicle lights 114 accordingly such that the vehicle lights 114 synchronize with the received activation signals 230.

At step 545, the server 120 may begin receiving the sequence of vehicle light control signals from the mobile device 100. The sequence of vehicle light control signals may be generated at the mobile device 100 using various techniques, such as, for example, the user 102 providing touch input at the mobile device 100, the user 102 selecting a predefined vehicle light activation pattern among a plurality of predefined vehicle light activation patterns, or matching the vehicle light activation pattern to the BPM of a song currently playing on the mobile device 100, as described hereinabove. For demonstration purposes, the procedure 500 shown in FIG. 5 focuses on generating the sequence of vehicle light control signals via touch input provided by the user 102 at the mobile device 100.

As described above, in the case of the user 102 providing touch input to the mobile device 100 to control the vehicle lights 114, vehicle light activation periods can be defined as periods during which the user's finger is in contact with an input element (e.g., button 104) of the mobile device 100, while vehicle light deactivation periods can be defined as periods during which the user's finger releases from the input element of the mobile device 100. During each activation period, the server 120 can continuously transmit the vehicle light activation signals 230 to the vehicle 110 (step 550), and transmission of the vehicle light activation signals 230 can be stopped once the activation period ends and a deactivation period begins.

Meanwhile, the vehicle control unit 112 can monitor for vehicle light activation signals 230 received from the server 120 at steps 555 and 560. If a vehicle light activation signal 230 is received at the vehicle control unit 112, meaning the user 102 is touching the input element of the mobile device 100, the vehicle control unit 112 can activate the vehicle light(s) 114, at step 565. Conversely, if no vehicle light activation signal 230 is received at the vehicle control unit 112, meaning the user 102 is not touching the input element of the mobile device 100, the vehicle control unit 112 can deactivate the vehicle light(s) 114, at step 570. The vehicle control unit 112 may continue to monitor for activation signals 230 from the server 120 and repeat steps 560-570, as shown in FIG. 5, so long as the vehicle recognition system is still active (step 575), thus forming a vehicle light control loop in which the vehicle lights 114 are synchronized with touch input from the user 102 at the mobile device 100. That is, the flashing vehicle lights can mimic the touch input provided by the user 102 at the mobile device 100.

The server 120 may continue to monitor for vehicle light control signals from the mobile device 100 so long as the ride sharing application, through which the user 102 can generate the sequence of vehicle light control signals, is still active on the mobile device 100 (step 580). Once the application running on the mobile device 100 has been closed, the server 120 may determine whether the vehicle 110 has picked up the user 102 (i.e., the requested ride is starting) or whether the requested ride has been canceled at step 585. If the requested ride has neither started nor been canceled, the server 120 may monitor for whether the mobile device 100 re-launches the ride sharing application, in which case the procedure 500 returns to step 545.

On the other hand, if the requested ride has either started (i.e., the vehicle 110 picked up the user 102) or been canceled, the server may deactivate the vehicle recognition system on the mobile device 100 at step 590, and deactivate the vehicle recognition system on the vehicle 110 at step 595. In response, the vehicle light control loop may terminate, indicating that the vehicle control unit 112 no longer needs to monitor for activation signals 230 from the server 120.

The procedure 500 illustratively ends at step 600. The techniques by which the steps of procedure 500 may be performed, as well as ancillary procedures and parameters, are described in detail above.

It should be noted that the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. The illustrated steps may also be modified in any suitable manner in accordance with the scope of the present claims.

Figure 6A:
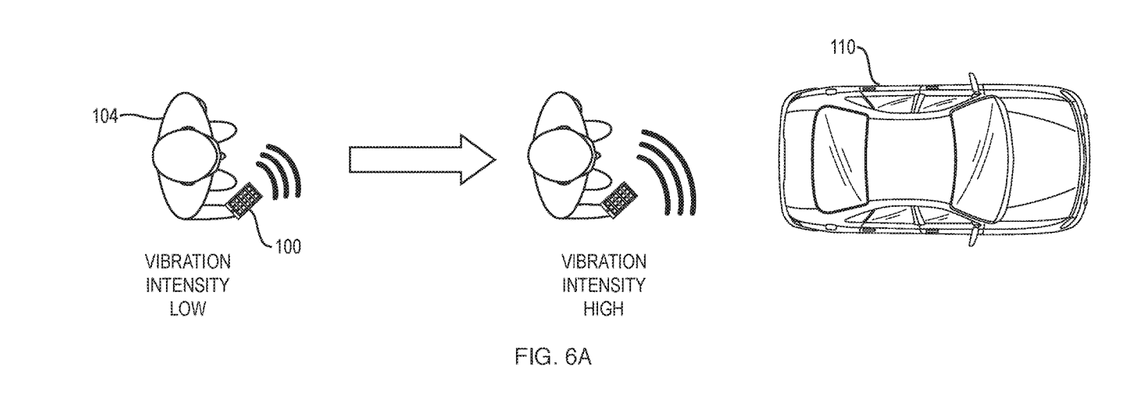
FIGS. 6A and 6B are diagrams illustrating exemplary schemes for controlling tactile feedback of a mobile device to assist the user in locating a vehicle.
Figure 6B:
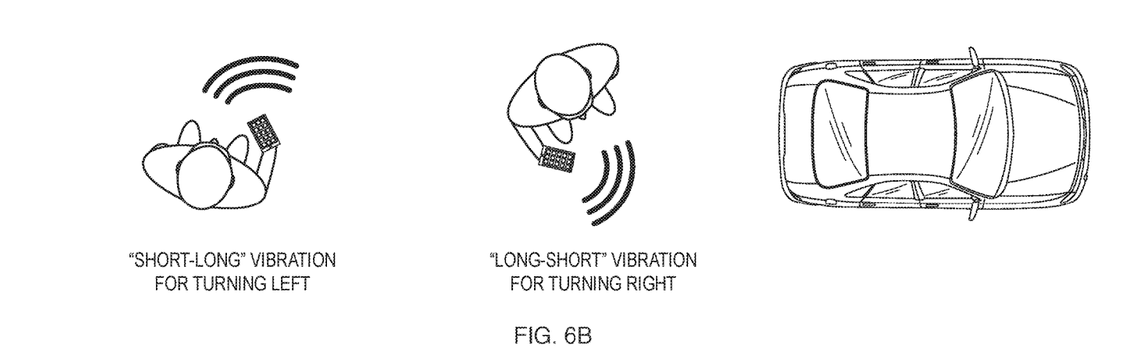

The vehicle recognition system described herein may also manipulate tactile feedback of the mobile device 100 to further assist the user 102 in locating the vehicle 110. To demonstrate, FIGS. 6A and 6B are diagrams illustrating exemplary schemes for controlling tactile feedback of a mobile device to assist the user in locating a vehicle. As shown in FIGS. 6A and 6B, tactile feedback can be delivered to the mobile device 100 and controlled according to a distance between the mobile device 100 and the vehicle 110 or according to an orientation of the mobile device 100 with respect to the vehicle 110. Manipulating the tactile feedback of the mobile device 100 provides another means for enhancing the user's ability to recognize the vehicle 110, particularly in areas where identifying a specific vehicle might be difficult.

First, as shown in FIG. 6A, the intensity of tactile feedback (i.e., vibration) delivered to the mobile device 100 can be adjusted according to the distance between the mobile device 100 and vehicle 110. In particular, the intensity of the tactile feedback at the mobile device 100 can increase as the user 102 gets closer to the vehicle 110, that is, as the distance between the mobile device 100 and the vehicle 110 decreases. This can be achieved either by enlarging the amplitude of the vibration alarm of the mobile device 100 or by increasing the frequency of vibrations (i.e., more vibrations per second) at the mobile device 100, as the user 102 moves closer to the vehicle 110.

Second, as shown in FIG. 6B, the length of tactile feedback pulses delivered to the mobile device 100 can be adjusted according to the orientation of the mobile device 100 with respect to the vehicle 110. In particular, different vibration pulses can be coded for the mobile device 100 to indicate whether the user 102 has to turn right or left to arrive at the vehicle 110. For example, a "SHORT-LONG" vibration pulse (i.e., a short pulse followed by a long pulse) could be delivered to the mobile device 100 when the user needs to turn left to arrive at the vehicle 110, while a "LONG-SHORT" vibration pulse (i.e., a long pulse followed by a short pulse) could be delivered to the mobile device 100 when the user needs to turn right to arrive at the vehicle 110.

Accordingly, techniques are described herein that enhance a user's ability to recognize a vehicle using a mobile device in communication with a control unit of a vehicle. In a scenario where a user has requested a ride using a ride-sharing service, the described techniques facilitate fast matching of the user and the user's designated vehicle at a pick-up location, which may be in an area with heavy traffic, darkness, or other factors making identifying the user's vehicle difficult. Confusion between the user and driver of the designated vehicle is reduced as a result. Trust and safety are also enhanced as a result, since the user can be positive he or she is entering the correct vehicle.

The foregoing description has been directed to embodiments of the present disclosure. It will be apparent, however, that other variations and modifications may be made to the described embodiments, with the attainment of some or all of their advantages. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   establishing, by a remote server, a wireless communication session with a mobile device of a user and a vehicle control unit equipped in a vehicle;
   receiving, at the remote server, a sequence of vehicle light control signals transmitted from the mobile device defining activation periods during which a vehicle light of the vehicle is to be activated alternating with deactivation periods during which the vehicle light is to be deactivated; and
   controlling, by the remote server, the vehicle light in synchronization with the sequence of vehicle light control signals while the sequence of vehicle light control signals is being received at the remote server,
   wherein the controlling of the vehicle light in synchronization with the sequence of vehicle light control signals includes:
      continuously transmitting, by the remote server, activation signals to the vehicle control unit to activate the vehicle light during each of the activation periods; and
      refraining, by the remote server, from transmitting the activation signals to the vehicle control unit to deactivate the vehicle light during each of the deactivation periods, and
   wherein each of the activation and deactivation periods is defined by a pressing period of the user and a releasing period of the user, a predefined vehicle light activation pattern selected by the user, or beats per minute (BPM) of a song currently playing on the mobile device.

2. The method of claim 1, wherein remote server activates and deactivates the vehicle light in accordance with a vehicle light activation pattern defined by the sequence of vehicle light control signals.

3. The method of claim 1, wherein a length of the activation periods and the deactivation periods, respectively, is variable throughout the sequence of vehicle light control signals.

4. The method of claim 1, wherein the sequence of vehicle light control signals is generated by user input of the user.

5. The method of claim 4, wherein the activation periods are defined as periods during which the user presses an input element of the mobile device, and the deactivation periods are defined as periods during which the user releases the input element of the mobile device.

6. The method of claim 5, wherein the input element is a button of the mobile device.

7. The method of claim 5, wherein the input element is a button displayed on a touch screen of the mobile device.

8. The method of claim 1, wherein the sequence of vehicle light control signals is selected by the user among a plurality of predefined sequences of vehicle light control signals.

9. The method of claim 8, wherein the vehicle light activation signals are transmitted to the remote server from the mobile device according to a vehicle light activation pattern defined by the user-selected predefined sequence of vehicle light control signals.

10. The method of claim 1, wherein the sequence of vehicle light control signals is defined according to the BPM of the song currently playing on the mobile device.

11. The method of claim 10, wherein the vehicle light activation signals are transmitted to the remote server from the mobile device according to a vehicle light activation pattern defined by the BPM of the currently playing song.

12. The method of claim 1, wherein the vehicle is a ride-sharing vehicle providing transportation for the user in response to a request from the user for a ride using a ride-sharing service.

13. The method of claim 1, further comprising:
controlling, by the remote server, tactile feedback of the mobile device according to a distance between the mobile device and the vehicle or according to an orientation of the mobile device with respect to the vehicle.

14. The method of claim 13, further comprising:
causing, by the remote server, the tactile feedback of the mobile device to increase in intensity as the distance between the mobile device and the vehicle decreases.

15. The method of claim 13, further comprising:
controlling, by the remote server, a length of tactile feedback pulses of the mobile device according to the orientation of the mobile device with respect to the vehicle.

16. The method of claim 1, wherein the wireless communication session with the mobile device and the vehicle control unit is established via a cellular network or via Bluetooth.

17. The method of claim 1, further comprising:
receiving, at the remote server, location information from the vehicle control unit indicating a location of the vehicle;
calculating, by the remote server, the location or a speed of the vehicle based on the received location information;
determining, by the remote server, whether the calculated location or the calculated speed satisfies a predetermined threshold; and
controlling, by the remote server, the vehicle light in synchronization with the sequence of vehicle light control signals when it is determined that the predetermined threshold is satisfied.

18. A system comprising:
a vehicle having a vehicle control unit equipped therein;
a mobile device of a user; and
a remote server operable to wirelessly communicate with the mobile device and the vehicle control unit,
wherein the remote server is configured to:
establish a wireless communication session with the mobile device and the vehicle control unit;
receive a sequence of vehicle light control signals transmitted from the mobile device defining activation periods during which a vehicle light of the vehicle is to be activated alternating with deactivation periods during which the vehicle light is to be deactivated; and
control the vehicle light in synchronization with the sequence of vehicle light control signals while the sequence of vehicle light control signals is being received at the remote server,
wherein the controlling of the vehicle light in synchronization with the sequence of vehicle light control signals includes:
continuously transmitting, by the remote server, activation signals to the vehicle control unit to activate the vehicle light during each of the activation periods; and
refraining, by the remote server, from transmitting the activation signals to the vehicle control unit to deactivate the vehicle light during each of the deactivation periods, and
wherein each of the activation and deactivation periods is defined by a pressing period of the user and a releasing period of the user, a predefined vehicle light activation pattern selected by the user, or beats per minute (BPM) of a song currently playing on the mobile device.

19. A method comprising:
establishing, by a remote server, a wireless communication session with a mobile device of a user and a vehicle control unit equipped in a vehicle;
receiving, at the remote server, positional information of the mobile device and positional information of the vehicle;
calculating, by the remote server, a distance between the mobile device and the vehicle or an orientation of the mobile device with respect to the vehicle according to the positional information of the mobile device and the positional information of the vehicle; and
controlling, by the remote server, tactile feedback of the mobile device according to the calculated distance between the mobile device and the vehicle or according to the calculated orientation of the mobile device with respect to the vehicle.

* * * * *